United States Patent

Ostic

[11] 3,976,103
[45] Aug. 24, 1976

[54] SLIDING SPOOL TYPE VALVE AND METHOD OF MAKING THE SAME

[75] Inventor: Alonzo M. Ostic, Rockford, Ill.

[73] Assignee: Rockford Servo Corporation, Rockford, Ill.

[22] Filed: Oct. 19, 1973

[21] Appl. No.: 408,191

[52] U.S. Cl. .................. 137/625.69; 29/157.1 R; 251/324; 251/367
[51] Int. Cl.² .......................................... F15B 13/04
[58] Field of Search ............. 29/157.1 R; 137/269, 137/270, 271, 625.69; 251/324, 367

[56] References Cited
UNITED STATES PATENTS

| | | | |
|---|---|---|---|
| 827,170 | 6/1906 | Murphy | 251/367 |
| 2,947,320 | 8/1960 | Oxley et al. | 137/271 |
| 3,202,170 | 8/1965 | Holbrook | 137/269 |
| 3,477,685 | 11/1969 | Ring | 137/625.69 X |
| 3,477,692 | 11/1969 | Ring | 137/625.69 X |
| 3,598,152 | 10/1971 | Andrews | 137/367 X |
| 3,719,199 | 3/1973 | Mentink | 137/625.69 X |

*Primary Examiner*—Alan Cohan
*Assistant Examiner*—Gerald A. Michalsky
*Attorney, Agent, or Firm*—Morsbach & Pillote

[57] ABSTRACT

A sliding spool type valve and method of making the same in which a set of like valve plates and a set of like pot plates are interleaved in a stack to form a laminated valve body having a central valve bore with valve ports at spaced locations therealong and a plurality of lengthwise extending flow passages at uniform angularly spaced positions around the valve bore, the port plates each having a transfer passage extending outwardly from the valve bore and the port plates of the set being disposed at relatively different angular positions in the stack to have the transfer passage communicate with different ones of the lengthwise extending flow passages. The port and valve plates have flat side faces and the plates are clamped together in a stack by bolts extending through angularly spaced bolt openings in the port and valve plates. The valve bore is honed after the plates are assembled in a stack to receive a sliding spool type valve member.

17 Claims, 15 Drawing Figures

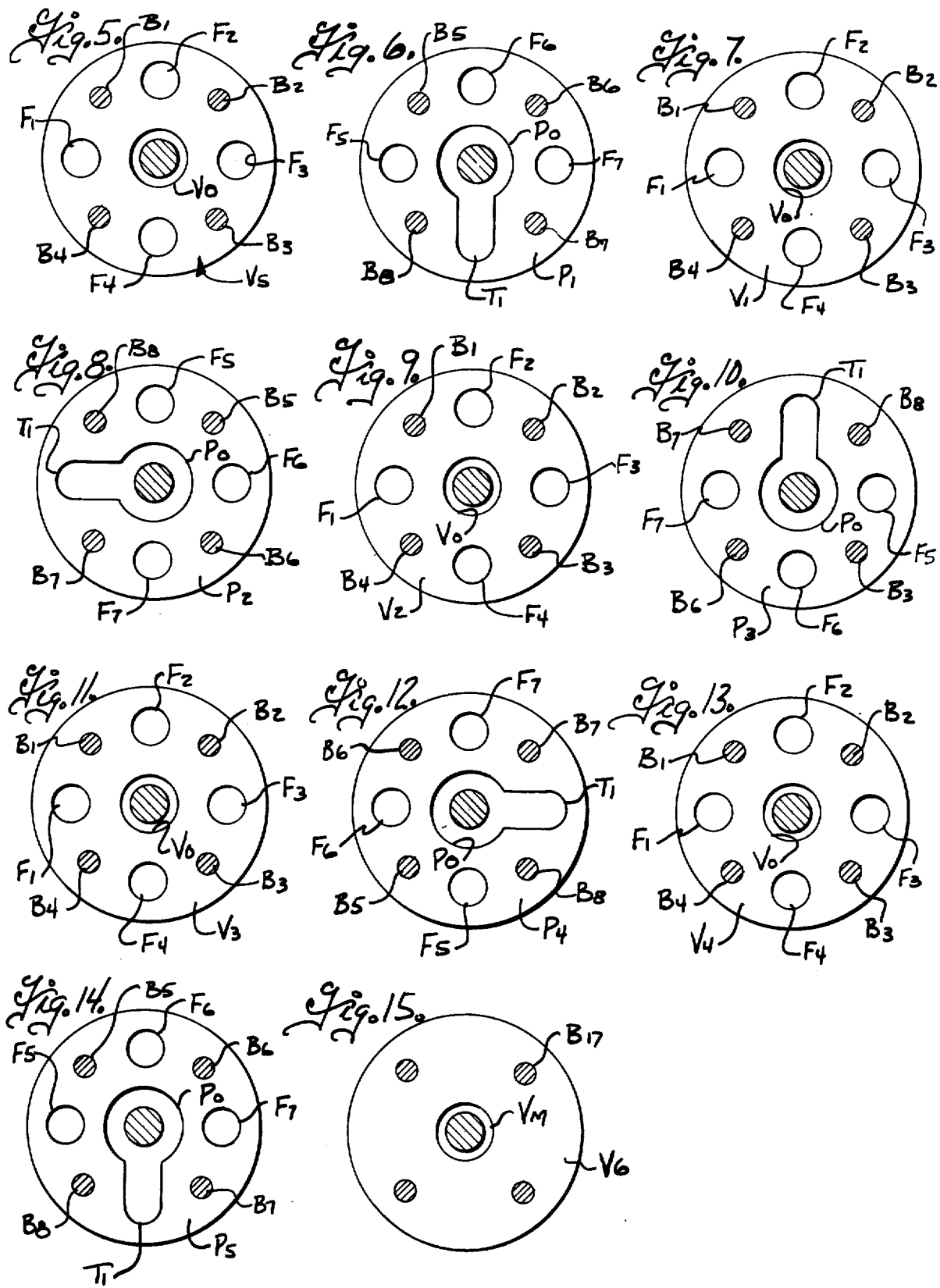

3,976,103

SLIDING SPOOL TYPE VALVE AND METHOD OF MAKING THE SAME

BACKGROUND OF THE INVENTION

In a sliding spool type valve, the valve body is provided with a plurality of valve ports including an inlet valve port, controlled outlet ports and return ports at spaced locations along the valve bore adapted for connection to different flow conduits, with annular valve seats between the adjacent ports cooperable with spaced lands on the sliding valve spool which controls flow between the several valve ports. In order to provide a satisfactory sliding spool type valve, it is necessary to accurately control the size, shape and spacing of the several valve ports along the valve bore with relation to the size and spacing of the lands on the valve spool. It is the common practice to form the valve bodies for such sliding spool type valves by casting the valve body with port recesses at spaced locations along the valve bore and thereafter machining the port openings utilizing an expansible tool that is inserted into the valve bore and which is expanded laterally of the valve bore at the appropriate locations therealong to machine the several valve ports. However, this machining operation is relatively slow and time consuming and even small imperfections in the machining of the valve ports, such as caused by scratches or nicks in the edge where the valve ports meet the valve seats, can cause leakage and erratic operation of the valve.

It has heretofore been proposed, as disclosed in the U.S. Pat. No. 3,598,152, to T. D. H. Andrews dated Aug. 10, 1971, to form a sliding spool type valve utilizing a plurality of relatively thick plates which are machined on the side surfaces prior to assembly to provide ports and flow passages which open laterally of the valve body. Such a valve construction, however, requires a number of differently machined and shaped plates to provide the several ports and passages. Moreover, that valve construction utilized relatively thick plates with passages that opened laterally of the valve body and additionally required substantial machining and assembly operations after the plates of the valve body were joined together, in order to provide a mounting pad and connection for the several flow passages.

SUMMARY OF THE INVENTION

A sliding spool type valve and method of making the same in which the valve body has a plurality of flat valve plates of like configuration each having a central valve opening and a number n of flow passage openings angularly spaced apart (360°/n) about the central valve opening, a plurality of flat port plates of like configuration each having a central port opening larger than the valve openings and a number n − 1 of flow passage openings arranged at positions angularly spaced apart (360°/n) about the central port opening and a transfer passage opening extending outwardly from the port opening at a position angularly spaced (360°/n) from two adjacent flow passage openings in the port plate. The port and valve plates are assembled in alternate succession in a stack with their flow passage openings arranged in axially aligned sets and the port plates are angularly positioned relative to the valve plates and relative to each other to have the transfer passage openings and at least one of the port plates register with each of the aligned sets of openings in the valve plates.

A valve spool extends lengthwise of the stack through the port and valve openings for controlling the flows therethrough. The valve is advantageously of the four-way type and includes at least four valve plates and at least five port plates assembled in alternate succession with the flow passage openings angularly spaced apart 90°. The valve and port plates are preferably formed by stamping openings in flat sheet stock, and thereafter face grinding or lapping the plates to a flattened condition, after which the plates are clamped together in an assembled stack and the valve openings thereafter honed to a uniform size and concentricity to receive the valve spool. Assembling of the plates in a stack to form the valve body is advantageously effected by punching bolt holes in the port and valve plates prior to assembly at locations angularly spaced apart (360°/n) so that the plates can be assembled on bolts in different relative angular positions to form the stacked assembly of plates.

An important object of this invention is to provide a sliding spool type valve and method of making the same in which the shape and spacing of the several valve ports along the valve bore can be accurately controlled.

Another object of this invention is to provide a sliding spool type valve construction and method of making the same in which the valve body can be economically formed from a stack of assembled valve and port plates.

Still another object of this invention is to provide a valve construction and method of making the same in which the number of different types of plates necessary to form the valve body is minimized so as to reduce overall cost and simplify manufacture and assembly.

These, together with other objects and advantages of this invention will be more readily understood by reference to the following detailed description when taken in connection with the accompanying drawings wherein:

FIGS. 5–15 are transverse sectional views through the valve body respectively taken on the planes 5–15 in FIG. 1.

Figure 2:
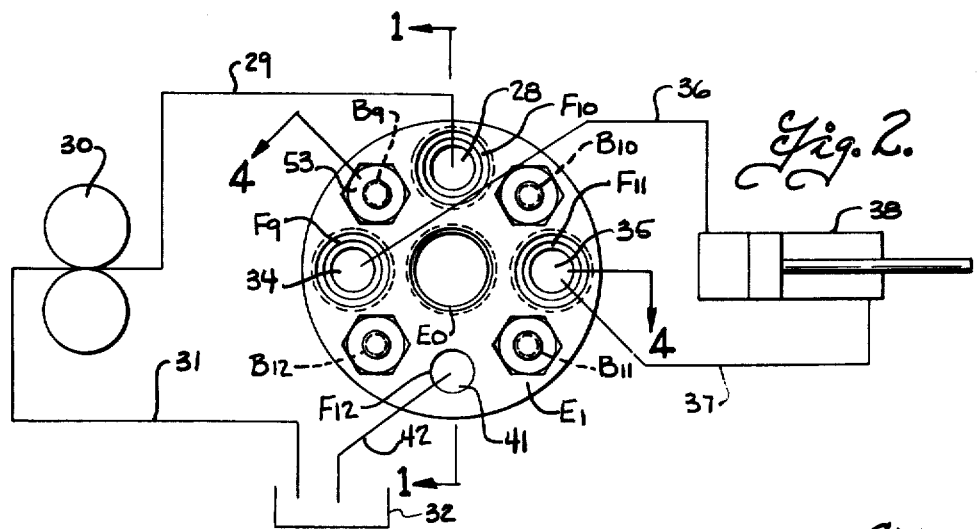
FIG. 2 is an end elevational view showing one end of the valve assembly and diagrammatically illustrating connection of the valve assembly in a servo system.

The present invention relates to a sliding spool type servo valve which in general includes a valve body 10 with a valve bore 11 extending therethrough, a pressure inlet port 12, a pair of controlled outlet ports 13, 14, and a pair of return ports 15, 16. A valve spool 17 is slidable in the valve bore and has spaced lands 18, 19 for controlling flows between the several valve ports and bosses 21, 22 adjacent opposite ends for slidably supporting the valve member in the valve bore. At least one valve actuator 25 is provided and may be of any conventional type such as a pneumatic valve actuator, an electro-responsive valve actuator, hydraulic valve actuator, etc. In the form, a single pneumatic valve actuator is mounted at one end of the valve and has a pressure responsive operator such as a diaphragm 26 connected to the valve spool and responsive to the fluid pressure in a chamber 27 applied thereto for actuating the valve. The valve is diagrammatically shown in FIG. 2 connected to a fluid system and, as shown, the valve has a flow passage 28 that communicates with the inlet port 12 and it is connected through a line 29 to the outlet of a pump 30, the inlet of the pump being connected through a line 31 to a reservoir 32. The valve also has controlled outlet passages 34 and 35 that communicate with the controlled outlet ports 13, 14 and which are connected through lines 36 and 37 to a remote operator 38, herein shown in the form of a linear fluid actuator having a cylinder and piston. The valve also has a return passage 41 communicating with the return ports 15, 16 and which is connected through a line 42 to the reservoir.

For proper valve operation, it is necessary to accurately control the shape and spacing of the valve ports along the valve in relation to the shape and spacing of the valve lands on the valve spool. In accordance with the present invention, the valve body is formed of a plurality of flat plates which are joined together in a stack to form a laminated valve body. In the preferred embodiment illustrated, the valve includes five flat port plates designated P1–P5 of like configuration, and at least four valve plates designated V1–V4 of like configuration, and which are interposed between adjacent ones of the valve plates. Rigid end members designated E1 and E2 are provided at opposite ends of the stack and, for reasons pointed out hereinafter, plates designated V5 and V6 are respectively interposed between the end members E1 and E2 and the adjacent ends of the stack.

As will be seen from FIGS. 7, 9, 11 and 13, the valve plates V1–V4 have the same configuration and each include a central valve opening designated VO, four flow passage openings designated F1–F4 spaced radially outwardly from the valve opening VO a preselected distance to lie in a common circular locus, and angularly spaced apart 90° from each other at four quadrantal positions. For reasons also pointed out hereinafter, each valve plate is also formed with at least four bolt holes designated B1–B4 each spaced radially outwardly from the central valve opening to lie in a common circular locus and angularly spaced apart 90° at four quadrantal positions preferably intermediate the positions of the passage openings F1–F4.

The port plates P1–P5, best shown in FIGS. 6, 8, 10, 12 and 14, are of like configuration and each include a central port opening PO having an area greater than the area of the valve opening VO in the valve plates. In the embodiment illustrated, the port openings PO have a circular configuration to form full annulus type ports in the valve, it being understood that the port openings could have a non-circular configuration if desired. The port plates also have three flow passage openings designated F5, F6 and F7 spaced outwardly from the center of the port opening a distance corresponding to the radial spacing of the flow passage openings F1–F4 in the valve plates to lie in a circular locus, and the flow passage openings F5–F7 are angularly spaced apart 90° to lie at three quadrantal positions. The port plates also have a transfer passage opening T1 that extends outwardly from the central port opening a distance at least equal to the spacing of the flow passage openings from the center of the port plate, with the transfer passage opening angularly spaced 90° from two adjacent ones of the flow passage openings F5 and F7 to lie at a fourth quadrantal position. The port plates P1–P5 also have four bolt openings designated B5–B8 spaced outwardly from the center of the port opening a distance corresponding to the radial spacing of the bolt openings B1–B4 from the center of the valve opening, to lie in a common circular locus and the bolt openings B5–B8 are angularly spaced apart 90° from each other to lie at four quadrantally spaced positions preferably angularly spaced 45° from the flow passage openings and transfer passage openings T1, as shown in the drawings.

As previously described, the port and valve plates are assembled alternately in a stack with one valve plate between each adjacent pair of port plates. When assembled in a stack, the flow passage openings F1–F4 in the valve plates are disposed in axial alignment. The port plates P1–P5 are disposed at different angular positions such that the transfer passages T1 in the several port plates respectively register with different ones of the flow passage openings F1–F4 in adjacent valve plates. As shown, the transfer passage T1 in the port plate P1 registers with the flow passage openings F4 in the adjacent valve plate V1; the transfer passage opening T1 in the port plate P2 registers with flow passage openings F1 in the plates V1 and V2; transfer passage opening T1 in port plate P3 registers with the flow passage openings F2 in the valve plates V2 and V3; and transfer passage opening T1 in port plate P4 registers with the flow passage opening F3 in the port plates V3 and V4. Port plate P5 is angularly positioned similar to port plate P1 so that its transfer passage T1 also registers with the flow passage openings F4 in the adjacent valve plates V4.

Thus, when the port plates P1–P5 and the valve plates V1–V4 are assembled as shown and described above, the flow passage openings F5–F7 and the transfer passage openings T1 in the several port plates communicate with different ones of the flow passage openings F1–F4 in the adjacent valve plates to provide four longitudinally extending flow passages 34, 28, 35 and 41 previously described. Moreover, the transfer passage openings T1 in the several port plates are arranged at different angular positions so that they communicate with different ones of the longitudinally extending flow passages.

Figure 1:
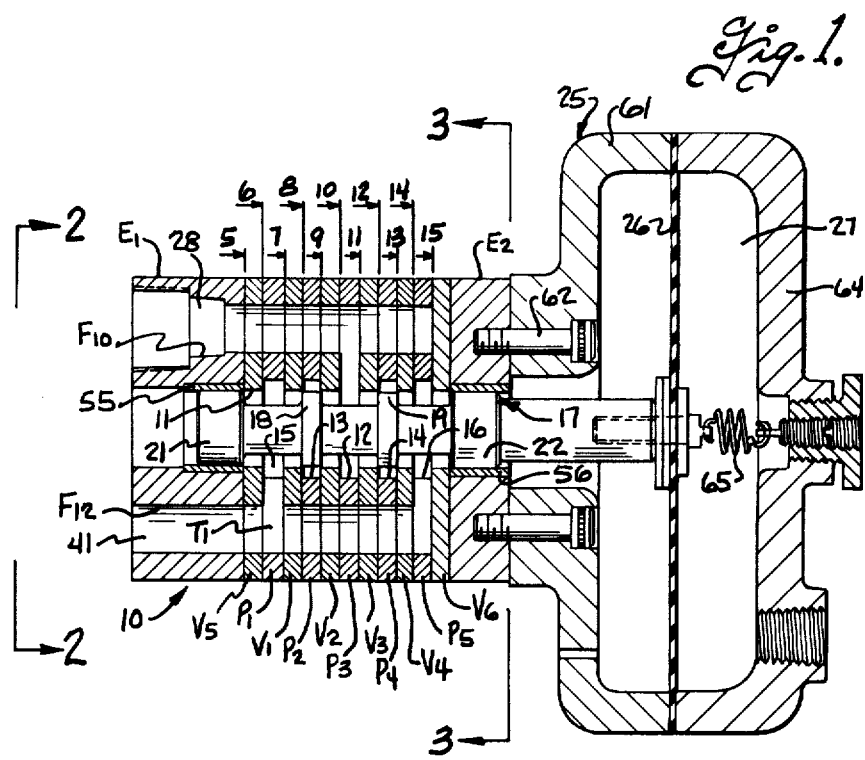
FIG. 1 is a longitudinal sectional view through the valve assembly having a valve actuator applied thereto and taken on the plane 1—1 of FIG. 2.
Figures 3, 4:
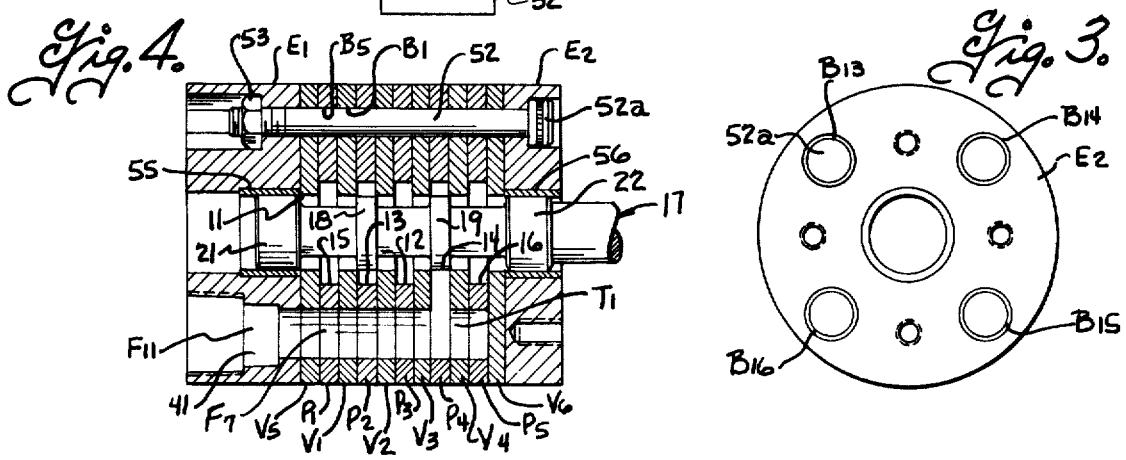
FIG. 3 is an end elevational view taken on the plane 3—3 of FIG. 1 illustrating the other end of the valve assembly.
FIG. 4 is a longitudinal sectional view taken on the broken section line 4—4 of FIG. 2.

Provision is made for connecting the flow passages adjacent their ends to the external hydraulic circuit. In the embodiment illustrated, all of the external hydraulic connections to the flow passages are made at one end of the valve body in the end member E1. It is to be understood, however, that the connections to the flow passages could be made at either or both ends of the valve body. In the embodiment illustrated, the end member E1 is formed with a central bearing opening designated EO and four angularly spaced flow passage openings designated to F9–F12, having a radial spacing corresponding to the spacing of the flow passage openings F1–F4 in the valve plates, and angularly spaced apart 90° to register with the flow passage openings. The openings F9–F12 have their outer ends adapted for connection to an external line and these openings may, for example, be internally threaded as shown in FIGS. 1 and 4 for the reception of a suitable base line fitting. While the outer ends of the openings F9–F12 are herein shown arranged to open in a direction paralleling the axis of the valve body, it will be understood that the end members E1 could be formed so that the passages F9–F11 open radially of the end member, instead of axially. Moreover, while all four flow passage openings F9–F11 are herein shown formed in one of the end members, it will be understood that one or more flow passage openings could be formed in the end member E2, if desired. End member E1 is formed with four bolt receiving openings B9–B12 angularly spaced apart 90° and in a circular locus to register with the bolt openings in the port and valve plates, and the end member E2 is similarly formed with bolt openings B13–B16 angularly spaced apart 90° and in a circular locus to also register with the bolt openings in the valve and port plates. Bolts 52 are adapted to extend through the aligned bolt openings in the valve and port plates and through the openings in the end members E1 and E2 and have a close radial fit in the bolt openings to radially position the port and valve plates relative to each other. As shown in FIG. 4, one of the end members E2 has its bolt openings formed with an enlarged recess at its outer end to receive the heads 52a of the bolts, and the other end member such as E1 has its bolt openings formed with an enlarged internally keyed socket portion adapted to slidably and non-rotatably receive the nuts 53 for the bolts. The heads 52a of the bolts have a socket or key for receiving a suitable wrench to enable tightening of the bolts.

The end members E1 and E2 could be clamped directly to the aforedescribed stacked assembly of the port plates P1–P5 and valve plates V1–V4. However, in order to reduce the cost, the end members E1 are advantageously formed by die casting. Since it is difficult to control the porosity of die castings, the end plates V5 and V6 are advantageously interposed between the ends of the aforedescribed stacked assembly of valve plates and the corresponding end members E1, E2. End plate V5 is conveniently of the same configuration as the valve plates V1–V4 and like numerals are used to designate the same parts including the central valve openings VO, and the four angularly spaced flow passage openings F1–F4 and bolt openings B1–B4. In the embodiment illustrated wherein the flow passage connections are provided at only one end of the valve member, the plate V6 is formed so as to close the flow passage openings at the other end of the valve member. For this purpose, valve plate V6 is similar to the plates V1–V5 and has a central opening Vm and four angularly spaced bolt openings B17, but the flow passage openings F1–F4 used in valve plates V1–V4 have been omitted so as to provide a closure for the ends of the flow passages.

The port and valve plates are each formed from blanks of flat sheet stock, preferably half-hard brass, having a thickness which is small as compared to the diameter of the valve openings and preferably having a thickness in a range of about ¼ to ⅛ inch. The valve opening VO, the several flow passage openings F1–F4 and the several bolt openings B1–B4 in the valve plates V1–V4 are preferably formed in the flat blanks by simultaneously punching the several openings through the blanks. Similarly, the port opening PO, the several flow passage openings F5–F7; the transfer passage opening T1; and the several bolt openings B5–B8 in the port plates P1–P5 are preferably formed in the flat blanks by simultaneously punching the several openings through the blanks. The same thickness stock is advantageously used for both valve and port plates.

The plates are thereafter face ground or lapped to a flatness such as to avoid any significant leakage therebetween that might occur between the valve bore and the different flow passages or between the valve bore, flow passages and the outside of the valve, when the valves are clamped in a stacked assembly. The lapping of the side faces is also controlled so that the plates, after lapping, have a preselected thickness to control the stacking depth of the several port and valve plates. The final thickness of the lapped port and valve plates can be accurately controlled so that the stacking depth of the plates, and hence the axial spacing of the ports along the valve bore in the assembled stack of plates, can be predetermined. The lands on the valve spool can thus be formed with the proper axial spacing to conform to the spacing of the port openings along the valve bore, without necessitating individual measurement of the port spacing in each valve body after assembly. The end members E1 and E2 are preferably provided with bearings 55 and 56 having a diameter corresponding to the diameter of the valve openings VO. The valve openings VO in the laminated valve assembly and the bearings in the end members are advantageously honed after assembly to a uniform size and concentricity for receiving the valve spool. As previously described, the valve spool has end lands 21 and 22 which are slidably received in the bearings, and intermediate lands 18 and 19 for controlling flows between the ports. In the form shown, the lands 18 and 19 have a width approximating the thickness of the port plates and are spaced apart a distance correlative with the combined thickness of the valve port plates V2, P3 and V4 disposed between the controlled outlet ports 13, 14 so as to control flows between the controlled outlet ports 13 or 14 and the inlet ports 12 and the return ports 15, 16.

As previously described, the valve actuator can be of any suitable construction. In the form shown, the valve actuator is of the fluid pressure operated type that includes a casting 61 which is fastened as by bolt 62 to one end of the valve body. A pressure responsive diaphragm 26 overlies the casting 61 and a chamber forming member 64 is clamped to the outer side of the diaphragm to define the pressure chamber 27 therewith. A biasing spring 65 is connected to the valve member to yieldably oppose movement of the diaphragm in response to the pressure differential on the diaphragm.

From the foregoing it is thought that the construction and method of making the valve will be readily understood. The valve utilizes five port plates of like configuration and at least four and preferably five valve plates also of like configuration so that the number of different parts which must be formed to produce the valve is minimized. Moreover, the port and valve plates can be formed by a simple stamping operation followed by face grinding or lapping of the side faces of the plates to the desired degree of flatness. After assembly of the laminated valve body, the valve bore is honed to a uniform size and concentricity to slidably receive the valve spool.

What is claimed is:

1. In a sliding spool type valve including a valve body and a valve spool slidable in the body, the improvement wherein said valve body comprises:

a. a plurality of flat valve plates of like configuration each having a central valve opening therethrough and a number $n$ of flow passage openings arranged at a uniform preselected radial distance from the center of the valve opening at positions angularly spaced apart $n/360°$, b. a plurality of flat port plates of like configuration each having a central port opening therethrough larger than said valve openings and a number $n-1$

7 of flow passage openings arranged at said uniform radial distance from the center of the port opening at positions angularly spaced apart ($360°/n$), and a through transfer passage opening extending outwardly from the port opening at least said preselected radial distance from the center of the port opening but less than the distance to the outer periphery of the port plate at a position angularly spaced ($360°/n$) from the positions of two adjacent ones of the flow passage openings in the port plate, c. the port and valve plates being arranged in alternate succession in a stack, the valve plates being angularly positioned relative to each other to have their flow passage openings arranged in axially aligned sets, the port plates being angularly positioned relative to the valve plates and relative to each other to have the transfer passage openings in the port plates registering with respective ones of the aligned sets of openings in the valve plates and with the flow passage openings in the port plates each registering with a flow passage opening in an adjacent valve plate to provide a number $n$ of flow passages extending lengthwise of the stack, equal to said number $n$ of flow passage openings in the valve plates, d. means for retaining the port and valve plates in an assembled stack, e. the valve spool extending lengthwise of the stack through the port and valve openings for controlling flow therethrough, the term $n$ at each occurrence herein being a whole number no less than three.

2. A sliding spool type valve according to claim 1 wherein said port and valve plates each have a set of bolt openings therein equal in number to said number $n$ of flow passage openings in the valve plate in a circular locus and angularly spaced apart ($360°/n$), and fasteners extending through said bolt openings for clamping said port and valve plates together.

3. A sliding spool type valve according to claim 1 including end members at opposite ends of said stack, passage means in at least one of said end members communicating with said flow passages and adapted for connection to external fluid conduits.

4. A sliding spool type valve according to claim 1 wherein the number of $n$ of flow passages in the valve plates equals four and the number of valve plates is at least four and the number of port plates equals five.

5. In a four-way sliding spool type valve including a valve body having a pressure port, a pair of controlled outlet ports and a pair of return ports and a valve spool slidable in the valve body, the improvement wherein said valve body comprises:

a. at least four flat valve plates of like configuration each having a central valve opening therethrough, and four flow passage openings arranged in a circular locus of preselected radius around the valve opening at four quadrantal positions, b. at least five flat port plates of like configuration each having a central port opening therethrough with an area larger than the central valve openings in the valve plates; three flow passage openings arranged in a circular locus of said preselected radius around the central port opening at three quadrantal positions and a through transfer passage opening extending from the respective central port opening and out to the circular locus and terminating inwardly of the periphery of the port plates at a fourth quadrantal position,

8 c. the port and valve plates being arranged alternately in a stack with one of said valve plates interleaved between adjacent ones of said port plates, said valve plates being relatively angularly positioned with the flow passage openings therein arranged in four axially aligned sets, the port plates being angularly positioned relative to the valve plates and relative to each other with the transfer passage openings in the port plates in register with respective ones of the four aligned sets of flow passage openings in the valve plates and with the flow passage openings in each port plate registering with respective ones of the aligned sets of flow passage openings in valve plates to provide four flow passages extending lengthwise of the valve body, d. means for retaining the valve and port plates in assembled relation, e. the valve spool extending lengthwise of the stack through the port and valve openings for controlling flows of fluid therethrough.

6. A four-way sliding spool type valve according to claim 5 wherein said means for retaining said valve and port plates in assembled relation comprises rigid end members at opposite ends of the stack of port and valve plates, the port and valve plates each having quadrantally positioned bolt openings extending therethrough and spaced from the flow passage openings therein, and bolts extending through the bolt openings in the port and valve plates and engaging the end members for clamping the port and valve plates together.

7. A four-way spool type valve according to claim 6 including passage means in at least one of said end members communicating with said flow passages in said stack and adapted for connection to external flow conduits.

8. A four-way sliding spool type valve according to claim 6 in which said bolt openings are each angularly spaced approximately 45° from adjacent ones of said flow passages.

9. A four-way sliding spool type valve according to claim 5 including first and second end plates at opposite ends of said stack of valve and port plates each having a central opening therethrough of a size corresponding to the size of the central valve openings in the valve plates, rigid end members at the outer sides of said end plates, and passage means in at least one of said end members and one of said end plates communicating with said four flow passages in said stack.

10. A four-way sliding spool type valve according to claim 5 wherein the two port plates adjacent opposite ends of said stack are arranged with their transfer passages in register with the same one of said four aligned sets of flow passage openings in the valve plates.

11. In a sliding spool type valve including a valve body having a valve bore, valve ports communicating with the bore at spaced locations therealong and a sliding spool valve member in the bore for controlling flows between the valve ports, the improvement wherein the valve body includes a set of flat port plates of like configuration and a set of flat valve plates of like configuration interleaved in a stack to form a laminated valve body, the valve plates each having a central valve opening extending therethrough and the port plates each having a central port opening extending therethrough and registering with the valve opening in adjacent valve plates to form a valve bore, said port openings having an area larger than said valve openings to provide valve ports at spaced locations along the valve bore between adjacent valve plates, the set of valve plates having a number *n* of flow passage openings arranged at a uniform preselected radial distance from the center of the valve openings and angularly spaced apart (360°/*n*), the valve plates in the stack being angularly positioned with the flow passage openings in axially aligned sets, the port plates each having a through transfer passage opening extending outwardly from the port opening at least said preselected radial distance but less than the distance to the outer periphery of the port plate and the port plates being angularly positioned relative to each other and to the valve plates with the transfer passage openings in the port plates registering with respective ones of said axially aligned sets of flow passage openings in the valve plates, the port plates each having a number equal to *n* − 1 of flow passage openings therein angularly spaced from each other and from the transfer passage opening (360°/*n*) to register with other of the aligned sets of flow passage openings in the valve plates, and means for retaining the port and valve plates in an assembled stack, where *n* at each occurrence is a whole number no less than three.

12. A sliding spool type valve according to claim 11 wherein the number of port plates in the set of port plates is at least *n*, and the number of valve plates in the set of valve plates is at least *n* − 1.

13. A sliding spool type valve according to claim 11 wherein the number of port plates in the set of port plates is at least *n* + 1, and the number of valve plates in the set of valve plates is at least *n*.

14. A sliding spool type valve according to claim 13 wherein said means for retaining said valve and port plates in an assembled stack includes *n* bolts extending through the port and valve plates and angularly spaced apart (360°/*n*).

15. A method of forming a sliding spool type valve including a valve body having an inlet port, a pair of controlled outlet ports and a pair of return ports communicating with an elongated valve bore, and a sliding spool valve member for controlling flow through the ports, said method comprising, a. forming at least four flat valve plates of like configuration each having a central valve opening and four flow passage openings arranged in a circular locus of preselected radius around the valve opening at four quadrantal positions, b. forming at least five flat port plates of like configuration each having a central port opening with an area greater than the valve openings; three flow passage openings arranged in a circular locus of said preselected radius around said central port opening at three quadrantal positions and a transfer passage opening extending from the respective central port opening out to the circular locus at a fourth quadrantal position, c. assembling the port and valve plates alternately in a stack with one of the valve plates interleaved between adjacent ones of the port plates, angularly positioning the valve plates during assembly with the flow passage openings arranged in four axially aligned sets, angularly positioning the port plates during assembly with the transfer passages in the port plates adjacent opposite ends of the stack in register with one of the axially aligned sets of flow passages to form said pair of return ports and with the transfer passages in three other port plates each registering with a respective one of the three other axially aligned sets of flow passages to form said inlet port and said pair of controlled outlet ports, d. securing the port and valve plates together into a rigid stack, and e. honing the valve openings in the valve plates to a uniform size and concentricity.

16. A method of forming a sliding spool type valve according to claim 15 wherein the openings in the ports and valve plates are formed by punching openings in flat sheet stock, and side faces of the port and valve plates are face ground after punching to flat condition.

17. A method of forming a sliding spool type valve according to claim 15 including forming a number *n* of bolt openings in each port and valve plates prior to assembly of the plates in a stack with the bolt openings arranged in a circular locus concentric with the locus of the flow passage openings in the port and valve plates and angularly spaced apart (360°/*n*), and assembling the port and valve plates in alternate succession onto bolts with the bolts extending through the bolt openings, and thereafter clamping the assembled plates together by the bolts the term *n* at each occurrence herein being four.

* * * * *